United States Patent
Amidei

Patent Number: 5,995,661
Date of Patent: Nov. 30, 1999

[54] IMAGE BOUNDARY DETECTION FOR A SCANNED IMAGE

[75] Inventor: James Stephen Amidei, San Diego, Calif.

[73] Assignee: Hewlett-Packard Company, Palo Alto, Calif.

[21] Appl. No.: 08/946,676

[22] Filed: Oct. 8, 1997

[51] Int. Cl.$^6$ .................................................. G06K 9/48
[52] U.S. Cl. .................. 382/199; 358/462; 382/174; 382/192; 382/291; 382/203; 382/295
[58] Field of Search .................................. 382/192, 193, 382/194, 199, 203, 292, 177, 173, 295, 174; 358/462

[56] References Cited

U.S. PATENT DOCUMENTS

| | | | |
|---|---|---|---|
| 4,513,442 | 4/1985 | Scherl | 382/49 |
| 4,856,075 | 8/1989 | Smith | 382/50 |
| 4,975,972 | 12/1990 | Bose et al. | 382/8 |
| 4,996,603 | 2/1991 | Kanemitsu | 358/462 |
| 5,033,104 | 7/1991 | Amano | 382/56 |
| 5,054,091 | 10/1991 | Tanaka et al. | 382/177 |
| 5,202,933 | 4/1993 | Bloomberg | 382/9 |
| 5,278,919 | 1/1994 | Sugiura et al. | 382/9 |
| 5,317,419 | 5/1994 | Koizumi | 358/462 |
| 5,443,164 | 8/1995 | Walsh et al. | 209/580 |
| 5,513,277 | 4/1996 | Huttenlocher | 382/171 |
| 5,513,304 | 4/1996 | Spitz et al. | 382/295 |
| 5,548,664 | 8/1996 | Knowlton | 382/174 |
| 5,596,655 | 1/1997 | Lopez | 382/173 |

*Primary Examiner*—Amelia Au
*Assistant Examiner*—Gilberto Frederick, II
*Attorney, Agent, or Firm*—Jerry R. Potts

[57] ABSTRACT

A bounding box is generated for a scanned image. A vertical edge of the scanned image is detected. A horizontal edge of the scanned image is also detected. The vertical edge is used as a rightmost edge of the bounding box. The horizontal edge is used as a bottom edge of the bounding box. The vertical edge is detected by, for each scan row, detecting when a first pixel in a substep of pixels of the scan row has a grey value which differs from a grey value of a pixel immediately to the right of the first pixel by at least a first predetermined constant. When such a first pixel is found, any edge from a previous row which is continued by the first pixel is detected. A longest edge in any row continued by the first pixel a length of the longest edge is stored. Also stored is an indication of a rightmost pixel of any edge continued by the first pixel. When the length of the longest edge continued by the first pixel exceeds a second predetermined constant, an x-coordinate of the rightmost pixel of any edge continued by the first pixel is stored as a current rightmost edge.

27 Claims, 4 Drawing Sheets

IMAGE BOUNDARY DETECTION FOR A SCANNED IMAGE

BACKGROUND

The present invention concerns optical scanning of an image and pertains particularly to detecting the boundaries of a scanned image.

Optical scanners allow images to be scanned into a computer system for modification and use. In addition, scanners are used when implementing such things as faxes and copiers. See for example the HP OfficePro 1150C printer (available from Hewlett Packard Company, having a business address of 3000 Hanover Street, Palo Alto, Calif. 94304), which functions as a color printer, a copier and a scanner, or the HP OfficeJet 570 printer (also available from Hewlett Packard Company), which functions as a color printer, a fax, a copier and a scanner.

It is sometimes desirable when scanning an image to determine a minimal rectangular bounding box within which that image lies. This is particularly useful when performing a copy of an image because the use of a minimal rectangular bounding box can limit the amount of processing needed to reproduce the image. In addition, the use of a minimal rectangular bounding box can be used in the implementation of various features on a copier.

Bounding boxes can be defined, for example, by performing a one bit black and white prescan of an image. The bounding box is then specified by the leftmost, rightmost, topmost, and bottommost black pixels. The disadvantage in this solution is that it has no ability to reject dust particle marks. If the algorithm is modified so there is the ability to reject dust particles marks, this can result in the rejection of marks from the actual image which should be used to help define the bounding box.

Other algorithms have used very elaborate means to define edges, classify and/or extend subregions, or perform other complex calculations. These algorithms have the disadvantage of requiring extensive CPU processing or large data arrays to process the prescanned image.

SUMMARY OF THE INVENTION

In accordance with the preferred embodiment of the present invention, a method is presented for generating a bounding box for a scanned image. A vertical edge of the scanned image is detected. A horizontal edge of the scanned image is also detected. The vertical edge is used as a rightmost edge of the bounding box. The horizontal edge is used as a bottom edge of the bounding box.

For example, the vertical edge is detected by, for each scan row, detecting when a first pixel in a substep of pixels of the scan row has a grey value which differs from a grey value of a pixel immediately to the right of the first pixel by at least a first predetermined constant. When such a first pixel is found, any edge from a previous row which is continued by the first pixel is detected. A length of the longest edge in any row continued by the first pixel is stored. Also stored is an indication of a rightmost pixel of any edge continued by the first pixel. When the length of the longest edge continued by the first pixel exceeds a second predetermined constant, an x-coordinate of the rightmost pixel of any edge continued by the first pixel is stored as a current rightmost edge.

In the preferred embodiment, for each scan row, pixels located to the right of the current rightmost edge are evaluated. Pixels to the left of the current rightmost edge will already be within the bounding box. Also, a first edge is included within any edge from a previous row which is continued by the first pixel when the first edge either includes a pixel directly above the first pixel or includes a pixel one pixel above and one pixel to the right of the first pixel. This allows for edges varying up to 45 degrees to be detected.

Similarly, the horizontal edge is detected by, for each scan row, detecting when a second pixel in a substep of pixels of the scan row has a grey value which differs from a grey value of a pixel immediately above the second pixel by at least the first predetermined constant. When such a second pixel is found, a longest horizontal edge which includes the second pixel is detected. When a total length of the longest horizontal edge exceeds the second predetermined constant, a y-coordinate of the second pixel is stored as a current bottom edge.

In the preferred embodiment, longest horizontal edge is detected by detecting any edge from a right of the second pixel which is continued by the second pixel. Also, any edge from a left of the second pixel which is continued by the second pixel is detected. An detected edge from the right of the second pixel is combined with an detected edge from the left of the second pixel to produce the longest horizontal edge.

In order to allow for up to a 45 degree angle in the horizontal edge, a first edge is included within any edge from the right of the second pixel which is continued by the second pixel when the first edge either includes a pixel directly to the right of the second pixel or includes a pixel one pixel above and one pixel to the right of the second pixel. Likewise, a second edge is included within any edge from the left of the second pixel which is continued by the second pixel when the second edge either includes a pixel directly to the left of the second pixel or includes a pixel one pixel above and one pixel to the left of the second pixel.

The present invention solves the problem of defining a minimal rectangular bounding box within which a scanned image lies. The minimal bounding box is defined while using a minimal amount of processing resources in terms of both CPU bandwidth and memory usage. This invention also solves a problem caused by dust or dirt particles on the copier glass or on the underside of the copier lid. Such particles appear in the prescanned image but do not, with this invention, expand the bounding box past its otherwise defined region. The design of this invention is flexible and is therefore reusable by future copier features such as image tiling and automatic document sheet feed detection.

DESCRIPTION OF THE PREFERRED EMBODIMENT

Figure 1:
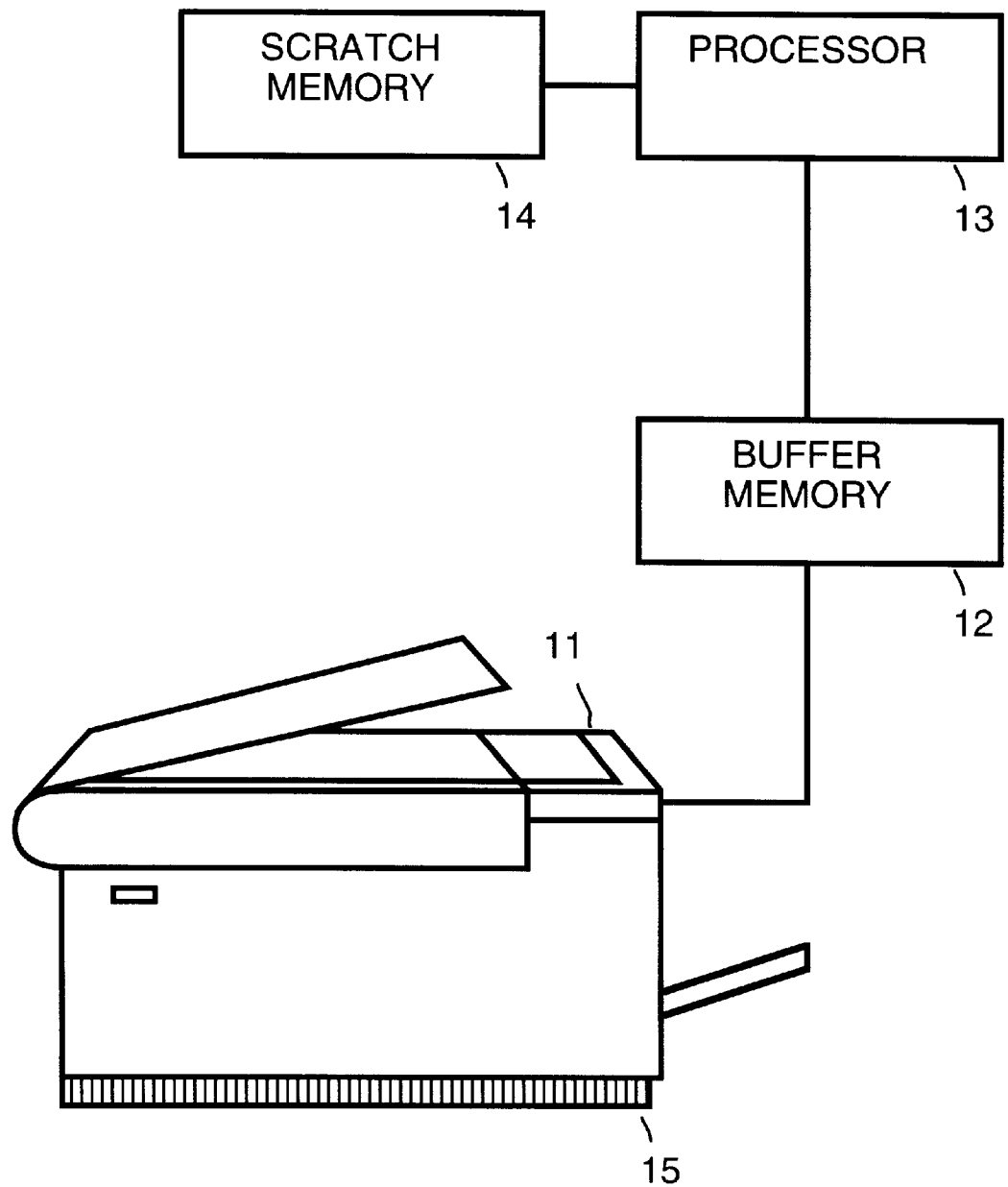
FIG. 1 shows a block diagram of a system which includes a processor, a scratch memory, buffer memory and a scanner.

FIG. 1 is a simplified diagram of a scanner system. An image received from a scanner 11, is buffered in buffer memory 12 and processed by a processor 13 using a scratch memory 14. For example, scanner 11 is part of a copier 15. Also in the preferred embodiment, buffer memory 12, processor 13 and scratch memory 14 are housed within copier 15.

In the preferred embodiment of the present invention, in order to determine a bounding box for an original image placed on scanner 11, a prescan is performed of an 8-bit gray scale replica image. Processor 13 processes the 8-bit gray scale replica image one row at a time. Processor 13 uses limited statistics it has computed from previous rows to define 'vertical' and 'horizontal' 'edges' in the replica image. For every scan row processed, processor 13 attempts to extend previously identified edge segments. Processor 13 keeps track of columns through which the vertical edges have passed and rows through which the horizontal edges have passed. After the entire replica image has been processed, processor 13 is aware of the rightmost column and the bottommost row through which a suitable edge segment has passed. In the preferred embodiment, the origin (column 0, row 0) is used to define the final two edges of the bounding box.

In the preferred embodiment, edge segments can be continued along 45 degree angles. This allows edges of any shape (curved, straight, or bent) to be followed on the orthogonal grid upon which processor 13 operates.

Further, the preferred embodiment of the present invention allows for flexibility as to the length to which an edge segment must grow before being considered suitable to be used in determining the bounding box. The preferred embodiment is also flexible as to the degree by which neighboring pixels must differ in order to define origination or continuation of an edge segment and is independent of the scanning resolution.

Once the edges of the bounding box have been determined, the information can be used, for example, in the implementation of an autozoom copy feature.

Figure 2:
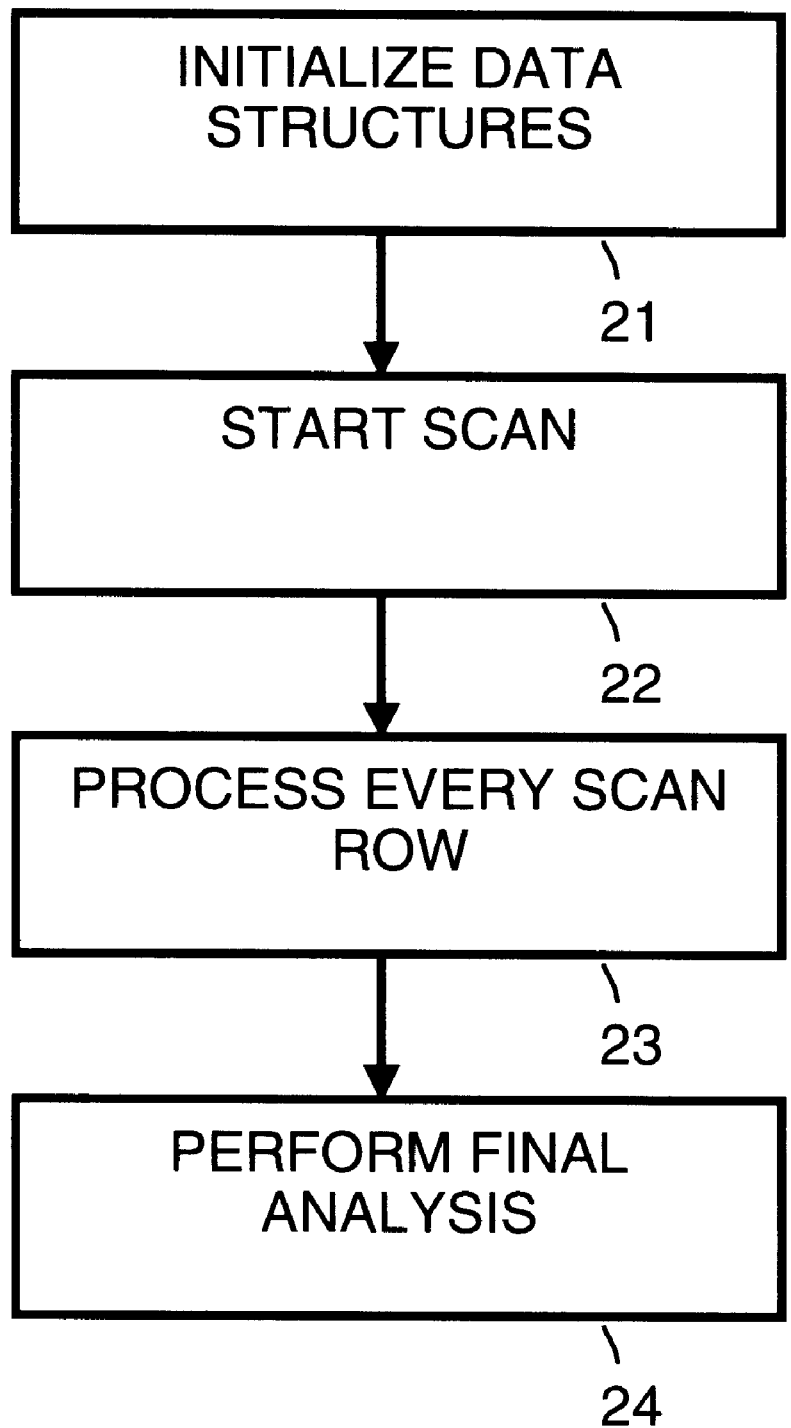
FIG. 2 is a simplified flow chart which provides an overview of the generation of a bounding box in accordance with the preferred embodiment of the present invention.

FIG. 2 is a simplified flow chart which provides an overview of a method processor 13 uses to generate a bounding box for an image placed on scanner 11. The method can be formed by analyzing, for example, a prescan image or a fully scanned image.

In a step 21, data structures are initialized. Step 21 is performed once for each scanned image.

In the preferred embodiment the data structures "current_row", "width", "right_edge" and "bottom_edge" are initialized as set out in Table 1, below:

TABLE 1

'current_row' = 0
'width' = number of columns (every scanned row has this many columns)
'right_edge' = 0
'bottom_edge' = 0

In addition, in step 21, space is allocated for six arrays. Every element in the array is initialized to 0. The array 'current[ ]' contains data for the current row. The array 'previous[ ]' contains data for the previous row or contains the difference between the current row and the previous row. The array 'right1[ ]' contains data about potential right-side edges. The array 'right2[ ]' contains data about potential right-side edges. The array 'bottoml[ ]' contains data about bottom-side edges merging from the right. The array 'bottomr[ ]' contains data about bottom-side edges merging from the left.

In a step 22, the scan is started. Step 22 is performed once for each image. In the preferred embodiment, the scan is a gray scale scan which produces 8-bits per pixel for 256 levels of gray. The number of levels of gray is arbitrary and may be varied for different embodiments of the present invention.

In the preferred embodiment the scan has a width which is equal to the number of columns. Thus the number of pixels is equal to the value of 'width'. The present invention works for any number of columns.

The resolution used is also arbitrary. In the preferred embodiment the resolution for the scan is set to 65 dots per inch (dpi). Greater resolution yields greater accuracy but also can slow the process as a result of pressing more data resulting from more columns per physical width of scan. In the preferred embodiment, each scan is 8.5 inches wide. Thus at 65 dpi, 'width' is equal to 65 dpi *8.5 inches, or 552 pixels (columns).

For the scan, raw data is desired. Therefore, any special scanning algorithms are turned off. For example, sharpening is turned off. Text enhance is turned off. Gray axis adjust is turned off. Any other special algorithms are also turned off to allow the capture of raw data.

Figure 3:
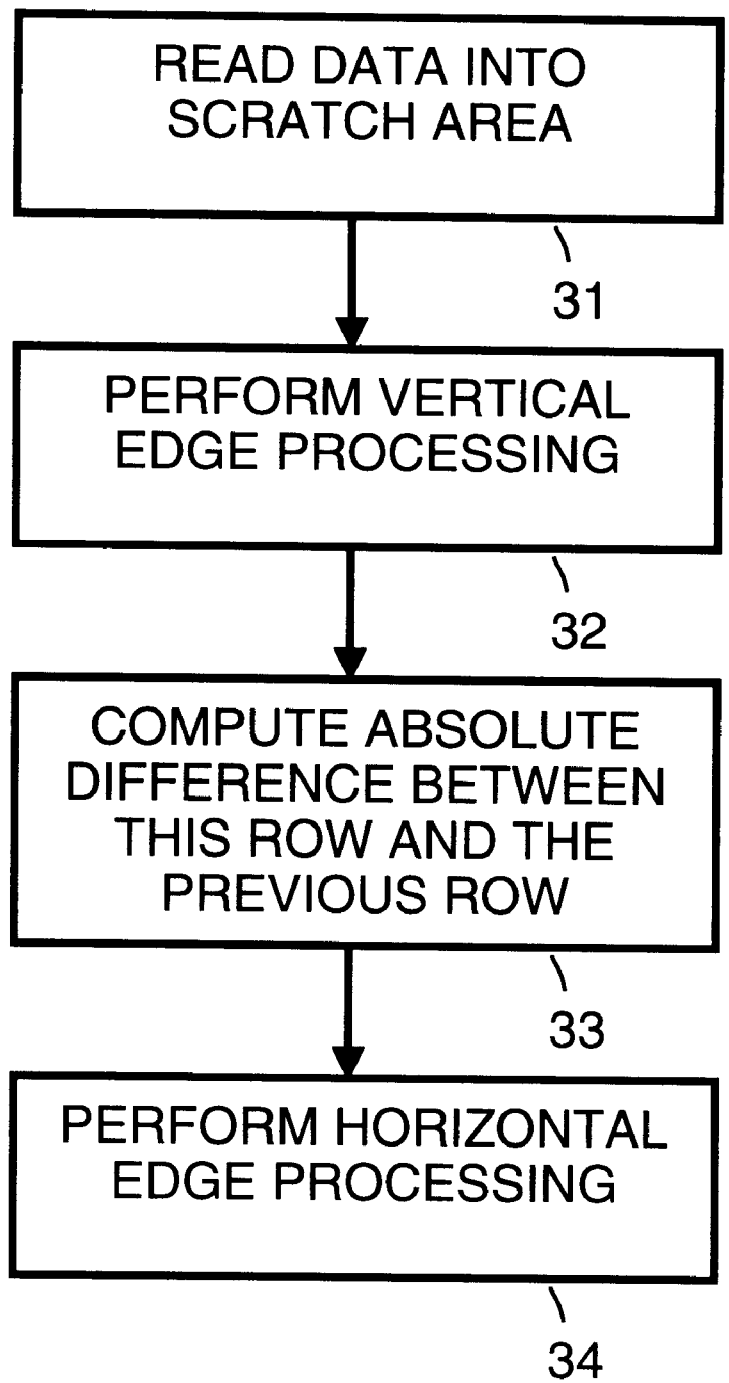
FIG. 3 is a simplified flow chart which illustrates how a single scan line is processed in accordance with the preferred embodiment of the present invention.

In a step 23, every scan line is processed. FIG. 3 illustrates how each scan line is processed.

In step 31, shown in FIG. 3, data for a scan line is read into scratch memory 14. Before this is done, however, array 'previous[ ]' and 'current[ ]' are swapped. That is, the names (pointers) to the arrays are swapped. The data that was previously called "current" is now called "previous" and the data that was previously called "previous" is now called "current". The swapping is done because new data will be read into the array 'current[ ]'. The values formerly in the array 'previous[ ]' can be overwritten and will be overwritten once the arrays are swapped. The information formerly in the array 'current[ ]' is saved in the array 'previous[ ]'.

Once the values in arrays 'previous[ ]' and 'current[ ]' are swapped, new data is read into the array 'current[ ]'. When the new data has been written in, for each pixel x in the scan row, the value in 'current[x]' represents the grey level for that pixel. As discussed above, in each scan line in the preferred embodiment there are 552 pixels, and thus there are 552 entries in the array 'current[ ]'.

If this is the first scan row for the array (i.e., current_row=0), no further processing is done for the scan row. The variable current_row is incremented and the next scan row is processed, beginning with step 31.

For every scan row other than the first scan row, (i.e., current_row>0), steps 32, 33 and 34 are performed.

In step 32, vertical edge processing is done. In the preferred embodiment, this is done by first initial initializing to zero two variables: "prev1" and "prev2".

For every pixel "i", beginning on the right of the scan at pixel "i" equal to the value "width" minus 2, and continuing to the left (by decrementing "i") until pixel "i" equals or is less than "right_edge" the following four steps are performed.

In the first step, a check is made for a 'vertical edge' between this pixel (pixel "i") and its neighbor to the right (pixel "i+1"). A 'vertical edge' is defined as a difference (+ or −) in grey values of more than a pre-defined constant, VISIBLE_V_EDGE_THRESH. In the preferred embodiment of the present invention, VISIBLE_V_EDGE_THRESH is set to 7. Alternatively, another value may be selected. The check for the vertical edge is accomplished by comparing current[i] with current[i+1]. Thus a vertical edge occurs upon detecting one of the conditions set out in Table 2 below:

TABLE 2 current[i]>current [i+1]+ VISIBLE_V_EDGE_THRESH
current[i]<current [i+1]- VISIBLE_V_EDGE_THRESH.

In the second step, if a vertical edge is discovered in the first step, an edge from a previous row is continued. This is done using two variables: "temp1" and "temp2". The variables "temp1" and "temp2" represent 2 different qualities about potential edges ending in pixel current[i]. The variable "temp1" represents the number of columns to the right the rightmost pixel of this current edge segment is located. The variable "temp2" represents the length (in vertical rows) of the current edge segment.

Thus if a vertical edge is discovered in the first step, the variables "temp1" and "temp2" are generated as set out in Table 3 below:

TABLE 3 temp1 = MAX(right1[i−1],right1[i]+1,right1[i+1]+2) − 1
temp2 = 1 + MAX(right2[i],right2[i+1])

These calculations will assure that any previously (from previous rows) seen edges that were seen to end directly above this pixel or that were seen to end directly above and one step to the right will be detected. This 'merges' potential edges from either directly above or from as much as a 45 degree angle.

If a vertical edge is not discovered in the first step, "temp1" and "temp2" are set to 0.

In a third step, the temp values (currently stored in "prev1" and "prev2") computed for the pixel to the right of current pixel (i.e., the temp values for the pixel current [i+1]) are stored. These temp values are stored in the arrays right1[ ] and right2[ ]. The temp values (currently stored in "temp1" and "temp2") for the current pixel (i.e., the temp values for the pixel current [i]) are temporarily stored in the variables "prev1" and "prev2" so that these temp values can be saved once we finish computations for the pixel to the left (i.e., pixel current [i−1]. This step is summarized by the operations set out in Table 4 below:

TABLE 4 right1[i+1]= prev1
right2[i+1]= prev2
prev1 = temp1
prev2 = temp2

In the fourth step, a check is made to see whether a vertical edge has been detected. A vertical edge occurs when the length of a line segment ending in the current pixel is greater than or equal to a pre-defined constant, MIN_SEQ_V_LINES. In the preferred embodiment, MIN_SEQ_V_LINES is equal to 8. Alternatively, MIN_SEQ_V_LINES can equal another value. When a right edge occurs, the variable right_edge is set. This indicates an edge segment of suitable length whose rightmost point matches the value stored in right_edge. The fourth step may be summarized as set out in the operation described in Table 5 below:

TABLE 5 if (temp2 >= MIN_SEQ_V_LINES) right_edge = i + temp1

After finishing the fourth step, if i is greater than right_edge, steps one through four are repeated for the pixel to the left. When i is less than or equal to right_edge, then step 32 has been completed. This is because it is not necessary to look to the left of where a right edge has already been found. areas to the left of where a right edge has been found will already be included in the bounding box.

In step 33, the absolute difference between the present row and previous row is computed. The previous data is no longer needed, but it will later be necessary to quickly reference the difference between the values in the previous row and the current row. This is accomplished as set by the operations set out in Table 6 below:

TABLE 6 for every pixel, i, in current[ ]do
  if (previous[i] > current[i])
    previous[i] = previous[i] − current[i]
  else
    previous[i] = current[i] − previous[i].

In a step 34, horizontal edge processing is performed. This as illustrated by FIG. 4.

Figure 4:
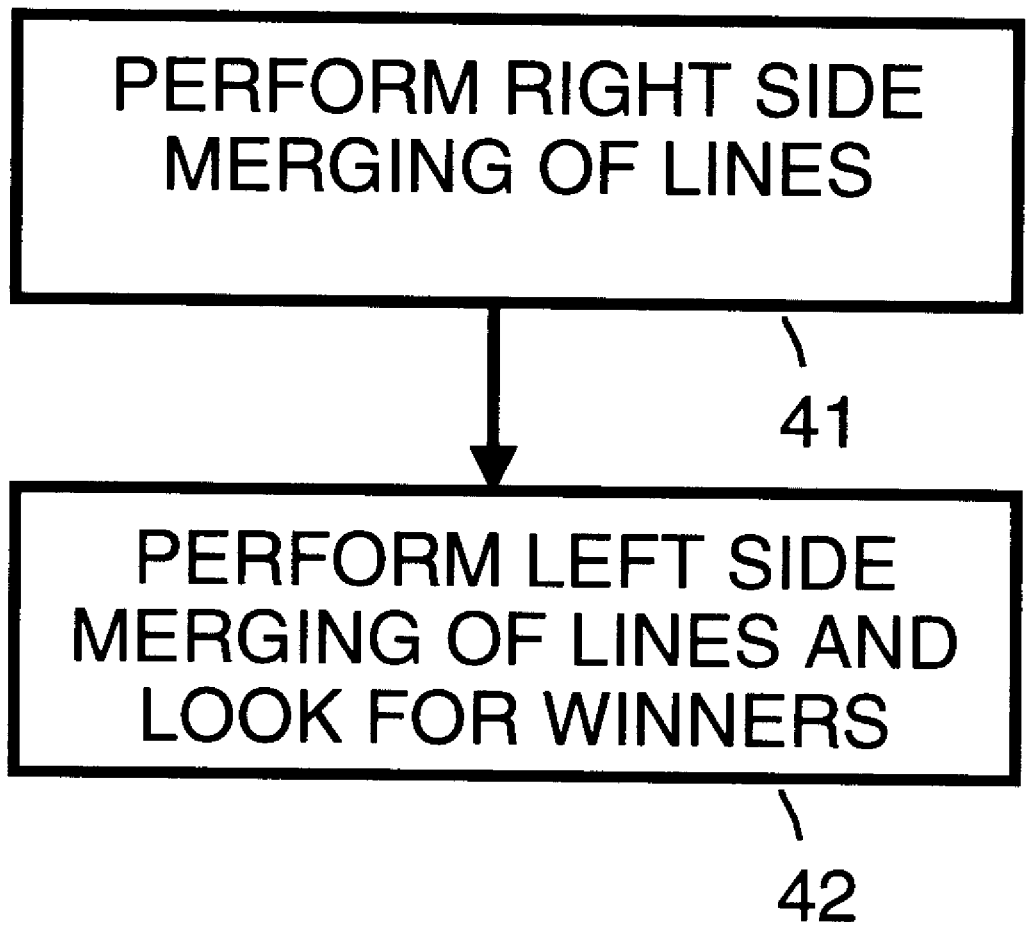
FIG. 4 is a simplified flow chart which illustrates how horizontal edge processing is accomplished in accordance with the preferred embodiment of the present invention.

In a step 41, shown in FIG. 4, a merging of lines on the right side is performed. This is done by first initializing the variable prev1 to 0. Then for every pixel, i, from width−2 down to 1, the following three steps are performed.

In the first step, a check is made for a 'horizontal edge' between the present pixel (current [i] and the pixel immediately above. A 'horizontal edge' is defined as a difference (+ or −) in grey values of more than a predefined constant, VISIBLE_H_EDGE_THRESH. In the preferred embodiment VISIBLE_H_EDGE_THRESH is equal to 7. Alternatively, VISIBLE_H_EDGE_THRESH can be set to equal another value. The first step is accomplished merely by checking if previous[i] is greater than VISIBLE_H_EDGE_THRESH.

In the second step, if a horizontal edge was found in the first step (i.e., previous[i]>VISIBLE_H_EDGE_THRESH), any previously (from previous pixels to the right) seen edges that ended directly to the right of this pixel or which ended directly to the right and one row above are continued. This merges potential edges from either directly adjacent and from as much as a 45 degree angle. In this case the operation set out in Table 7 below is performed:

TABLE 7 temp1 = 1 + MAX(prev1,bottoml[i+1]).

For the above operation, the variable "prev1" represents the line segments that ended directly to the right ("prev1" was computed as part of the previous iteration). The variable bottoml[i+1] refers to line segments that ended to the right and one row 'above' this row. This term was generated while processing the previous row.

If a horizontal edge was not found in the first step the temp1 is set to 0.

In a third step, the previously computed prev1 is stored so that this value may be used when processing future rows. The variable bottoml[i+1] is replaced with the value of prev1. The variable bottoml[i+1] will no longer represent the previous row's value but will now represent this row's value. This step is accomplished by the operations set out in Table 8 below:

TABLE 8 bottom1[i+1] = prev1;
prev1 = temp1.

After the third step, i is decremented and if i is not less than 1, the three steps are repeated. When i is less than 1, then the loop is exited.

In a step 42, left-side merging of lines is performed and winners are looked for. First, the variable prev1 is initialized to 0. Then for each pixel (i) from 2 up to width−1, the following four steps are performed.

In the first step, a check is made for a 'horizontal edge' between the present pixel (current [i] and the pixel immediately above. As described above, a 'horizontal edge' is defined as a difference (+ or −) in grey values of more than a pre-defined constant, VISIBLE_H_EDGE_THRESH. In the preferred embodiment VISIBLE_H_EDGE_THRESH is equal to 7. Other values for VISIBLE_H_EDGE_THRESH may be used. This first step is accomplished merely by checking if previous[i] is greater than VISIBLE_H_EDGE_THRESH.

In the second step, if a horizontal edge was found in the first step (i.e., previous[i]>VISIBLE_H_EDGE_THRESH), any previously (from previous pixels to the left) seen edges that ended directly to the left of this pixel or which ended directly to the left and one row above are continued. This merges potential edges from either directly adjacent and from as much as a 45 degree angle. In this case the operation set out below in Table 9 is performed:

TABLE 9 temp1 = 1 + MAX(prev1,bottomr[i−1]).

For the above operation, the variable "prev1" represents the line segments that ended directly to the left (it was computed as part of the previous iteration). The variable bottomr[i−1] refers to line segments that ended to the left and one row 'above' this row. This term was generated while processing the previous row.

If a horizontal edge was not found in the first step the temp1 is set to 0.

In a third step, the previously computed prev1 is stored so that future rows will be able to use it. The variable bottomr [i−1] is replaced with the value of prev1. The variable bottomr[i−1] will no longer represent the previous row's value but will now represent this row's value. This step is accomplished by the operations set out in Table 10 below:

TABLE 10 bottomr[i−1] = prev1;
prev1 = temp1.

In a fourth step, winners are looked for. If the total length of the two potential line segments ending in the current pixel (one from left and one from right) is greater than a pre-defined constant, MIN_SEQ_H_LINES then bottom_edge is set to the current line number. In the preferred embodiment, MIN_SEQ_H_LINES equals 8. Step 4 is accomplished by the operation set out in Table 11 below:

TABLE 11 if (prev1 + bottoml[i] >MIN_SEQ_H_LINES)
then bottom_edge = current_row;

After completing this fourth step, current_row is incremented, and if there are still any scan rows remaining, steps 31 through 34 (shown in FIG. 3) are repeated for the remaining scan rows.

In a step 24 (shown in FIG. 2) final analysis is performed. When step 24 is reached, the values 'right_edge' and 'bottom_edge' are currently set to the correct values and define a bounding box. That is, the variable "right_edge" is the x coordinate of the bottom right point of the bounding box. The variable bottom_edge is the y coordinate of the bottom right point of the bounding box. The top left point of the bounding box is the origin (0,0). The coordinates for the four corners of the rectangular bounding box are thus (0,0), (right_edge,0), (0,bottom_edge) and (right_edge,bottom_edge).

The final analysis consists of any calculations to be performed with these 'coordinates'. For example, the coordinates of the bounding box can be used to determine how much to scale the image to fit an entire page.

Once the bounding box has been generated, a rescan can be performed for the image within the bounding box. The scanned image can then be printed out or stored for later use.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for generating a bounding box for a scanned image comprising the following steps:
 (a) detecting a vertical edge of the scanned image, including the following substep:
  (a.1) for each scan row, performing the following substeps for a subset of pixels in the scan row:
   (a.1.1) detecting when a first pixel in the substep of pixels has a grey value which differs from a grey value of a pixel immediately to the right of the first pixel by at least a first predetermined constant, and
   (a.1.2) when in substep (a.1.1), the first pixel in the substep of pixels has a grey value which differs from the grey value of the pixel immediately to the right of the first pixel by at least the first predetermined constant, performing the followings substeps:
    (a.1.2.1) detecting any edge from a previous row which is continued by the first pixel,
    (a.1.2.2) storing, for a longest edge in any row continued by the first pixel, a length of the longest edge,
    (a.1.2.3) storing an indication of a rightmost pixel of any edge continued by the first pixel, and
    (a.1.2.4) when the length of the longest edge continued by the first pixel exceeds a second predetermined constant, storing an x-coordinate of the rightmost pixel of any edge continued by the first pixel as a current rightmost edge;
 (b) detecting a horizontal edge of the scanned image;

(c) using the vertical edge as a rightmost edge of the bounding box; and, (d) using the horizontal edge as a bottom edge of the bounding box.

2. A method as in claim 1 wherein in substep (a.1) for each scan row, the subset of pixels includes pixels located right of the current rightmost edge.

3. A method as in claim 1 wherein in substep (a.1.2.1) a first edge is included within any edge from a previous row which is continued by the first pixel when the first edge either includes a pixel directly above the first pixel or includes a pixel one pixel above and one pixel to the right of the first pixel.

4. A method as in claim 1 wherein step (b) includes the following substep:

(b.1) for each scan row, performing the following substeps for a horizontal subset of pixels in the scan row:

(b.1.1) detecting when a second pixel in the substep of pixels has a grey value which differs from a grey value of a pixel immediately above the second pixel by at least the first predetermined constant, and (b.1.2) when in substep (a.1), the second pixel in the substep of pixels has the grey value which differs from the grey value of the pixel immediately above the second pixel by at least the first predetermined constant, performing the followings substeps:

(b.1.2.1) detecting a longest horizontal edge which includes the second pixel, and (b.1.2.2) when a total length of the longest horizontal edge exceeds the second predetermined constant, storing a y-coordinate of the second pixel as a current bottom edge.

5. A method as in claim 4 wherein substep (b.1.2.1) includes the following substeps:

(b.1.2.1.1) detecting any edge from a right of the second pixel which is continued by the second pixel;

(b.1.2.1.2) detecting any edge from a left of the second pixel which is continued by the second pixel; and (b.1.2.1.3) combining any edge from the right of the second pixel detected in substep (b.1.2.1.1) with any edge from the left of the second pixel detected in substep (b.1.2.1.2) to produce the longest horizontal edge.

6. A method as in claim 5 wherein substep (b.1.2.1.1) a first edge is included within any edge from the right of the second pixel which is continued by the second pixel when the first edge either includes a pixel directly to the right of the second pixel or includes a pixel one pixel above and one pixel to the right of the second pixel.

7. A method as in claim 5 wherein substep (b.1.2.1.2) a first edge is included within any edge from the left of the second pixel which is continued by the second pixel when the first edge either includes a pixel directly to the left of the second pixel or includes a pixel one pixel above and one pixel to the left of the second pixel.

8. A method for generating a bounding box for a scanned image comprising the following steps:

(a) detecting a vertical edge of the scanned image;

(b) detecting a horizontal edge of the scanned image, including the following substep:

(b.1) for each scan row, performing the following substeps for a horizontal subset of pixels in the scan row:

(b.1.1) detecting when a first pixel in the substep of pixels has a grey value which differs from a grey value of a pixel immediately above the first pixel by at least a first predetermined constant, and (b.1.2) when in substep (b.1.1), the first pixel in the substep of pixels has the grey value which differs from the grey value of the pixel immediately above the first pixel by at least the first predetermined constant, performing the followings substeps:

(b.1.2.1) detecting a longest horizontal edge which includes the first pixel, and (b.1.2.2) when a total length of the longest horizontal edge exceeds a second predetermined constant, storing a y-coordinate of the first pixel as a current bottom edge;

(c) using the vertical edge as a rightmost edge of the bounding box; and, (d) using the horizontal edge as a bottom edge of the bounding box.

9. A method as in claim 8 wherein substep (b.1.2.1) includes the following substeps:

(b.1.2.1.1) detecting any edge from a right of the first pixel which is continued by the first pixel;

(b.1.2.1.2) detecting any edge from a left of the first pixel which is continued by the first pixel; and (b.1.2.1.3) combining any edge from the right of the first pixel detected in substep (b.1.2.1.1) with any edge from the left of the first pixel detected in substep (b.1.2.1.2) to produce the longest horizontal edge.

10. A method as in claim 9 wherein substep (b.1.2.1.1) a first edge is included within any edge from the right of the first pixel which is continued by the first pixel when the first edge either includes a pixel directly to the right of the first pixel or includes a pixel one pixel above and one pixel to the right of the first pixel.

11. A method as in claim 9 wherein substep (b.1.2.1.2) a first edge is included within any edge from the left of the first pixel which is continued by the first pixel when the first edge either includes a pixel directly to the left of the first pixel or includes a pixel one pixel above and one pixel to the left of the first pixel.

12. A method for detecting a vertical edge of a scanned image comprising the following step:

(a) for each scan row, performing the following substeps for a subset of pixels in the scan row:

(a.1) detecting when a first pixel in the substep of pixels has a grey value which differs from a grey value of a pixel immediately to the right of the first pixel by at least a first predetermined constant, and (a.2) when in substep (a.1), the first pixel in the substep of pixels has a grey value which differs from the grey value of the pixel immediately to the right of the first pixel by at least the first predetermined constant, performing the followings substeps:

(a.2.1) detecting any edge from a previous row which is continued by the first pixel, (a.2.2) storing, for a longest edge in any row continued by the first pixel, a length of the longest edge, (a.2.3) storing an indication of a rightmost pixel of any edge continued by the first pixel, and (a.2.4) when the length of the longest edge continued by the first pixel exceeds a second predetermined constant, storing an x-coordinate of the rightmost pixel of any edge continued by the first pixel as a current rightmost edge.

13. A method as in claim 12, wherein in substep (a.1) the first predetermined constant is 7.

14. A method as in claim 12 wherein in step (a) for each scan row, the subset of pixels includes pixels located right of the current rightmost edge.

15. A method as in claim 12 additionally comprising the following step:
   (b) using the current rightmost edge as an x-coordinate of the vertical edge.

16. A method as in claim 12 wherein in substep (a.2.1) a first edge is included within any edge from a previous row which is continued by the first pixel when the first edge either includes a pixel directly above the first pixel or includes a pixel one pixel above and one pixel to the right of the first pixel.

17. A method for detecting a horizontal edge of a scanned image comprising the following step:
   (a) for each scan row, performing the following substeps for a subset of pixels in the scan row:
      (a.1) detecting when a first pixel in the substep of pixels has a grey value which differs from a grey value of a pixel immediately above the first pixel by at least a first predetermined constant, and
      (a.2) when in substep (a.1), the first pixel in the substep of pixels has the grey value which differs from the grey value of the pixel immediately above the first pixel by at least the first predetermined constant, performing the followings substeps:
         (a.2.1) detecting a longest horizontal edge which includes the first pixel, and
         (a.2.2) when a total length of the longest horizontal edge exceeds a second predetermined constant, storing a y-coordinate of the first pixel as a current bottom edge.

18. A method as in claim 17 wherein substep (a.2.1) includes the following substeps:
   (a.2.1.1) detecting any edge from a right of the first pixel which is continued by the first pixel;
   (a.2.1.2) detecting any edge from a left of the first pixel which is continued by the first pixel; and
   (a.2.1.3) combining any edge from the right of the first pixel detected in substep (a.2.1.1) with any edge from the left of the first pixel detected in substep (a.2.1.2) to produce the longest horizontal edge.

19. A method as in claim 17 wherein substep (a.2.1.1) a first edge is included within any edge from the right of the first pixel which is continued by the first pixel when the first edge either includes a pixel directly to the right of the first pixel or includes a pixel one pixel above and one pixel to the right of the first pixel.

20. A method as in claim 17 additionally comprising the following step:
   (b) using the current bottom edge as a y-coordinate of the horizontal edge.

21. A processing system for determining in a matrix array having fixed minimum and maximum x coordinate values and fixed minimum and maximum y coordinate values a minimal rectangular boundary box within which a replica image of an original scanned document is defined, comprising:
   a processor having:
      a horizontal edge arrangement for determining a variable right edge x coordinate value for helping to define a bottom right corner of said boundary box; and
      a vertical edge arrangement for determining a variable bottom edge y coordinate value for further helping to define said bottom right corner of said boundary box, wherein said vertical edge arrangement includes:
         a portion of a buffer memory for temporarily storing image data indicative of the replica image, said image data being defined by a plurality of gray scale pixel values arranged in rows and columns to facilitate image processing purposes;
         a pixel processor for determining row by row and pixel by pixel whether the gray scale pixel value of a current pixel in a given row differs from the gray scale value of an adjacent pixel in the same row by at least a predetermined constant vertical value and for determining whether the current pixel in said given row extends a line segment having a given length exceeding another predetermined constant vertical value; and,
         a portion of a scratch memory for storing an x coordinate value of the right most pixel in said line segment extended by said current pixel when said line segment has a given length exceeding said another predetermined constant vertical value;
   wherein said x coordinate value of the right most pixel in said line segment being defined as said variable right edge x coordinate value when the current pixel is the last pixel in said image data.

22. A processing system according to claim 21, wherein said horizontal edge arrangement includes:
   another portion of said buffer memory for temporarily storing image data indicative of the replica image;
   said pixel processor for further determining row by row and pixel by pixel whether the gray scale pixel value of said current pixel in said given row differs from the gray scale value of an adjacent pixel immediately above in an adjacent row not defining a boundary edge with a y coordinate value of zero by at least a predetermined constant horizontal value and for determining whether the current pixel in said given row extends a horizontal line segment having a given length exceeding another predetermined constant horizontal value;
   another portion of said scratch memory for storing a y coordinate value of the current pixel when said horizontal line segment has a length exceeding said another predetermine constant horizontal value; and
   said y coordinate value of the current pixel being defined as said variable bottom edge y coordinate value when the current pixel is the last pixel in said image data.

23. A processing system according to claim 22, further comprising:
   a boundary coordinate defining arrangement responsive to said horizontal edge arrangement and said vertical edge arrangement for defining top left corner coordinate values, top right corner coordinate values, bottom left corner coordinate values and bottom right corner coordinate values of the boundary box;
   said top left corner having x and y coordinate values defined respectively by 0 and 0 respectively;
   said top right corner having x and y coordinate values defined respectively by 0 and a determined variable right edge x coordinate value;
   said bottom left corner having x and y coordinate values defined respectively by 0 and a determined variable bottom edge y coordinate value; and
   said bottom right corner having x and y coordinate values defined respectively by said determined variable right edge x coordinate value and said determined variable bottom edge y coordinate value.

24. A method for determining in a matrix array having fixed minimum and maximum x coordinate values and fixed minimum and maximum y coordinate values a minimal rectangular boundary box within which a replica image of an original scanned document is defined, comprising:

determining a variable right edge x coordinate value for helping to define a bottom right corner of said boundary box; and determining a variable bottom edge y coordinate value for further helping to define said bottom right corner of said boundary box;

wherein said step of determining a variable right edge x coordinate value includes:

temporarily storing image data indicative of the replica image, said image data being defined by a plurality of gray scale pixel values arranged in rows and columns to facilitate image processing purposes;

determining row by row and pixel by pixel whether the gray scale pixel value of a current pixel in a given row differs from the gray scale value of an adjacent pixel in the same row by at least a predetermined constant value and for determining whether the current pixel in said given row extends a line segment having a given length exceeding another predetermined constant value; and storing an x coordinate value of the right most pixel in said line segment extended by said current pixel when said line segment has a given length exceeding said another predetermined constant;

said x coordinate value of the rightmost pixel in said line segment being defined as said variable right edge x coordinate value when the current pixel is the last pixel in said image data.

25. A method according to claim 24, further comprising:

defining a top left corner location of the boundary box in said matrix array, said top left corner having x and y coordinate values defined respectively by 0 and 0 respectively;

determining a top right corner location of the boundary box in said matrix array, said top right corner having x and y coordinate values defined respectively by 0 and a determined variable right edge x coordinate value;

determining a bottom left corner location of the boundary box in said matrix array, said bottom left corner having x and y coordinate values defined respectively by 0 and a determined variable bottom edge y coordinate value; and determining a bottom right corner location of the boundary box in said matrix array, said bottom right corner having x and y coordinate values defined respectively by said determined variable night edge x coordinate value and said determined variable bottom edge y coordinate value.

26. A method for generating a bounding box for an image comprising the following steps:

(a) performing a scan of an original of the image to produce a scanned image;

(b) processing the scanned image one row at a time, including the following substeps:

(b.1) using limited statistics computed from previous rows to define vertical edges and horizontal edges in the scanned image, and (b.2) performing the following substeps for every scan row processed:

(b.2.1) attempting to extend previously identified edge segments, and (b.2.2) keeping track of columns through which vertical edges have passed and rows through which horizontal edges have passed;

(c) using a rightmost column through which an edge segment of at least a first minimal length has passed as a vertical edge of the bounding box; and, (d) using a bottommost row through which an edge segment of at least a second minimal length has passed as a bottom edge of the bounding box;

wherein in step (b) edge segments can be continued along 45 degree angles.

27. A method for generating a bounding box for an image comprising the following steps:

(a) performing a scan of an original of the image to produce a scanned image, wherein the scan is an 8-bits per pixel prescan;

(b) processing the scanned image one row at a time, including the following substeps:

(b.1) using limited statistics computed from previous rows to define vertical edges and horizontal edges in the scanned image, and (b.2) performing the following substeps for every scan row processed: –(b.2.1) attempting to extend previously identified edge segments, and (b.2.2) keeping track of columns through which vertical edges have passed and rows through which horizontal edges have passed;

(c) using a rightmost column through which an edge segment of at least a first minimal length has passed as a vertical edge of the bounding box; and, (d) using a bottommost row through which an edge segment of at least a second minimal length has passed as a bottom edge of the bounding box.

* * * * *